United States Patent [19]

Focht

[11] 4,428,344

[45] Jan. 31, 1984

[54] ENGINE KNOCK ANTICIPATION

[75] Inventor: Louis R. Focht, Farmington Hills, Mich.

[73] Assignee: Ford Motor Company, Dearborn, Mich.

[21] Appl. No.: 338,461

[22] Filed: Jan. 8, 1982

[51] Int. Cl.³ .............................................. F02P 5/04
[52] U.S. Cl. ......................................... 123/425; 73/35; 123/422
[58] Field of Search .................... 73/35; 123/425, 435, 123/422

[56] References Cited

U.S. PATENT DOCUMENTS

| 4,012,942 | 3/1977 | Hamed | 73/35 |
| 4,066,054 | 1/1978 | Caron et al. | |
| 4,104,998 | 8/1978 | Fenn | |
| 4,153,020 | 5/1979 | King et al. | |
| 4,276,861 | 7/1981 | Kearney et al. | 123/425 |
| 4,344,400 | 8/1982 | Asano | 123/425 |
| 4,346,586 | 8/1982 | Furrey | 123/425 |
| 4,357,918 | 11/1982 | Asano | 123/425 |
| 4,370,963 | 2/1983 | Iwata et al. | 123/425 |

FOREIGN PATENT DOCUMENTS

| 16548 | 10/1980 | European Pat. Off. | 123/425 |
| 54-59529 | 5/1979 | Japan | 123/425 |
| 2001130 | 1/1979 | United Kingdom | 123/425 |

Primary Examiner—Parshotam S. Lall
Attorney, Agent, or Firm—Peter Abolins; Robert D. Sanborn

[57] ABSTRACT

An engine operating parameter which anticipates knock, such as throttle angle position, is used in combination with a knock sensor to generate a control signal to retard engine spark. For example, the relatively slow response of a low noise sensed knock signal can be compensated by a relatively fast response signal indicating change in the throttle angle position. Thus earlier and improved control of knock can be achieved.

2 Claims, 3 Drawing Figures

ENGINE KNOCK ANTICIPATION

BACKGROUND OF THE INVENTION

1. Field of the Invention

This invention relates to knock detection for vehicle engines.

2. Prior Art

Spark knock in a vehicle mounted internal combustion engine produces a vibration or characteristic pinging sound.

Various knock sensors for detecting knock are known. Typically, upon detection of knock, the spark is retarded to eliminate knock. Known knock sensors include various accelerometers wherein a mass vibrates in response to engine vibration. This vibration is sensed electrically to produce an output signal. For example, a piezoelectric crystal mounted on a disc free to vibrate can produce an output electrical signal.

A common shortcoming in such systems is that they only correct knock after it occurs. It would be advantageous to be able to anticipate the occurrence of knock and prevent it from happening. Further, conventional knock sensors and detector systems usually exhibit relatively low signal to noise ratios. This requires the use of low pass filtering or other signal averaging techniques to reduce the effects of noise. The resulting control system time delay usually permits several knocks to be heard whenever the throttle is rapidly opened. This transient knock disappears as the control system responds by retarding the spark. These are some of the problems this invention overcomes.

SUMMARY OF THE INVENTION

In accordance with an embodiment of this invention, even the first few knocks of a knock sequence are eliminated by anticipation of transient knock conditions from a signal generated, in part, by a throttle angle position sensor. Movement of the throttle to an open position is an instigator of knock and can thus be used as an open loop knock anticipator. The throttle angle signal is applied to a high pass filter so as to complement the low pass filtering of the knock sensor signal. The throttle angle signal can be made to contribute only an anticipatory component when combined with the knock sensor signal for use by a knock control system.

As a result, knock is reduced during changes in acceleration. In particular, use of the throttle angle position sensor provides an anticipation of knock onset. Alternatively, the manifold absolute pressure may be used instead of throttle angle position to provide information to predict knock.

DETAILED DESCRIPTION OF THE INVENTION

Figure 2:
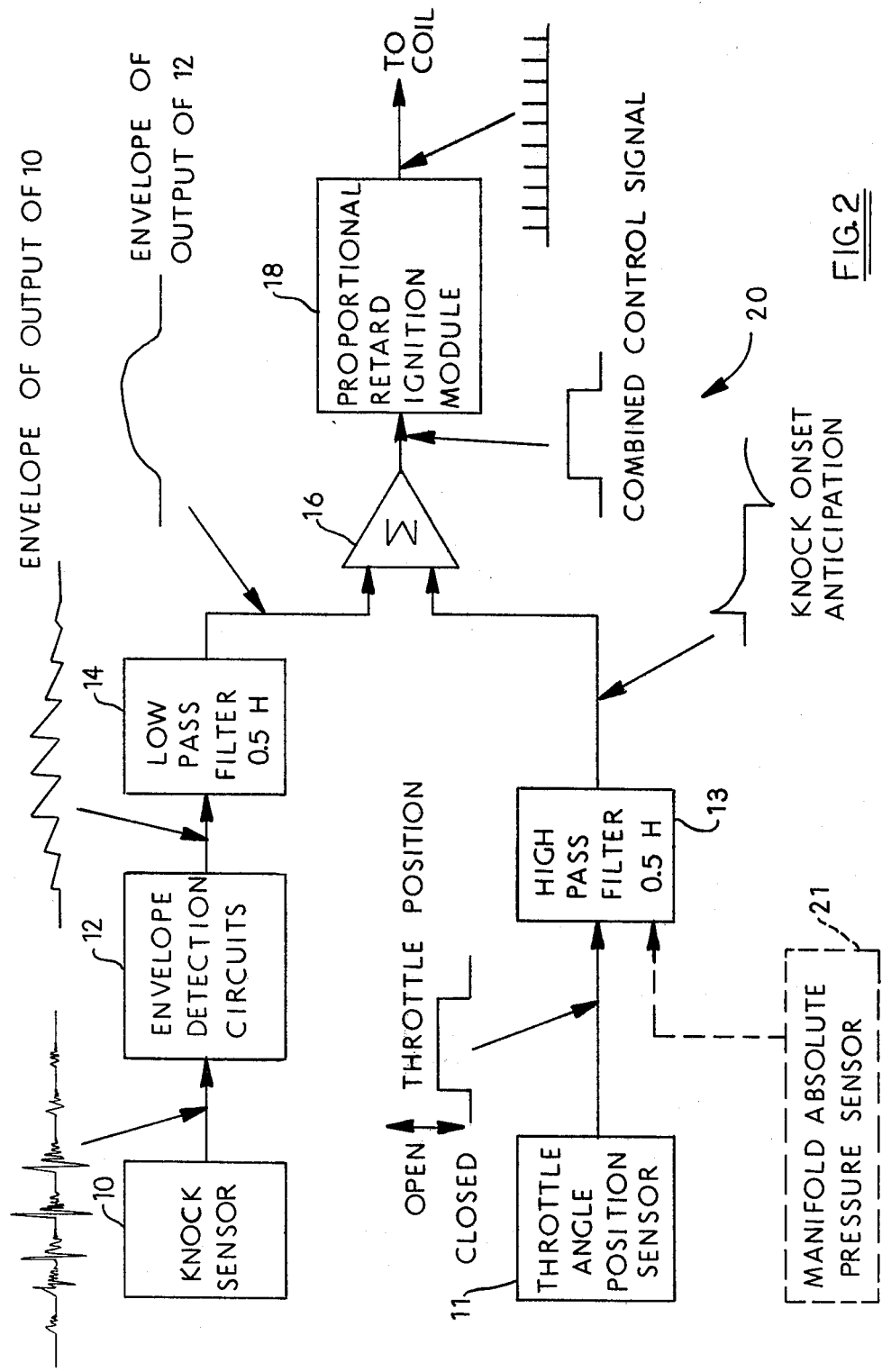
FIG. 2 is a block diagram of a knock detector anticipatory circuit in accordance with an embodiment of this invention and includes signal waveforms at various positions of the circuit.

Referring to FIG. 2, knock anticipatory and control system 20 includes a knock sensor 10 and a throttle angle position sensor 11 to provide the two primary input signals. In particular, knock sensor 10 can be responsive to vibration and provide an input to an envelope detection circuit 12 which produces an output based on the peaks of the signals from knock sensor 10. A low pass filter 14 processes the signal from the envelope detection circuit 12 to provide a signal indicating the occurrence of knock. The output of low pass filter 14 is applied to a summer 16.

Throttle angle position sensor 11 applies a signal to a high pass filter 13 which then applies another input to summer 16. The combined control signal from summer 16 is applied to a proportional retard ignition module 18. A typical knock sensor 10 is an acceleration responsive sensor, and a typical throttle angle position sensor 11 is a resistive slider type wherein slider movement is proportional to throttle movement. FIG. 2 also shows a manifold absolute pressure sensor 21 which may be used instead of throttle angle position sensor 11.

In operation, throttle angle position sensor 11 is used in combination with high pass filter 13 for the purpose of producing a knock onset anticipation signal. The knock onset anticipation signal is then combined with a knock sensor output by summer 16 which provides the combined control signal to a proportional retard ignition module 18 which controls the spark. Proportional retard ignition module 18 acts to retard the spark timing with respect to cylinder position by an amount proportional to the signal magnitude and duration applied to ignition module 18. That is, larger signal amplitudes and durations will cause increased amounts of spark retardation. As a result, through the use of knock anticipation from the throttle, the first few knocks in a knocking condition are eliminated. The throttle angle signal is filtered to produce a derivative signal which contributes only an anticipatory component when summed with the conventional knock control signal.

Control system 20 provides the ability to eliminate the first audible knock in a series of knocks. Typically, known prior art knock systems have operated so that once an initial knock, usually audible, initiates a spark retard sequence, the spark retard is maintained at a level just permitting some unaudible knock. In contrast, the initial knock can be eliminated by the use of the knock anticipation signal. High pass filter 13 provides the derivative of the throttle position signal applied to filter 13 by sensor 11. A change in throttle position produces a signal with a relatively large magnitude when position change occurs relatively rapidly. Thus, initial movement of the throttle causes an output signal from summer 16 of sufficient magnitude to cause ignition module 18 to initiate spark retard. At the same time, the output from knock sensor 10 alone is not sufficient to cause initiation of spark retard.

Spark retard can occur proportional to knock intensity. Advantageously, the output control signal from summer 16 must exceed a minimum threshold in order to cause a first discrete spark retard. That is, below the minimum threshold the spark is advanced to a maximum value. There can be an output control signal from summer 16 even if the only input for summer 16 originates at throttle angle position sensor 11. That is, the minimum threshold to retard the spark can be reached even if there is no input from low pass filter 14 as a result of sensed knock. In other words, there will be some spark retard initiated when there is a sufficiently rapid change in throttle position even if there is no sensed knock. However, after the rate of change of throttle position movement is reduced, further retard will only take place in response to knock sensed by the knock sensor.

Referring to FIGS. 1a through 1e, a waveform sequence indicates the use of a prior art knock sensor without any anticipation circuit. Referring to FIGS. 3a through 3d, a waveform sequence is shown in accordance with an embodiment of this invention and includes spark retard due to anticipation and knock.

Figure 1:
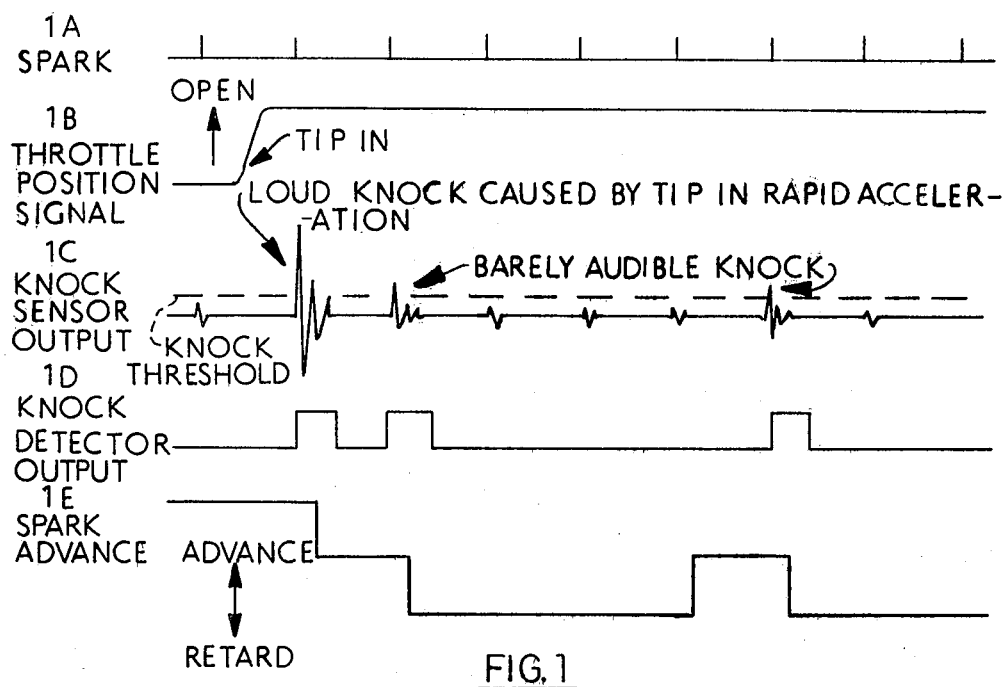
FIGS. 1a through 1e are graphical representations of signals related to a prior art knock feedback control system including the occurrence of spark, throttle angle position, knock sensor output, knock detector output and spark advance.

In particular, FIG. 1a shows the occurrence of spark voltage with respect to time. FIG. 1b shows the throttle position signal as the throttle is opened. FIG. 1c shows the output of the knock sensor wherein the signal exceeds the knock threshold after the throttle has been opened. The first knock after the opening of the throttle is easily audible. The knock control system then operates to reduce knock and subsequent knock is barely audible. FIG. 1d is the output of a knock detector which processes the signal from the knock sensor to provide an indication whenever the knock threshold is exceeded by the knock sensor output. That is, whenever the signal from the knock sensor is below the knock threshold there is no output from the knock detector. FIG. 1e shows the spark advance caused by the operation of a prior art knock control signal. Changes in advance occur in response to indication of knock by the knock detector. Typically, the spark is retarded a predetermined amount upon each detection of knock. Thus, there are shown two steps retarding a spark upon detection of the first two occurrences of knock. There is no further retard of the spark because there is no further detection of knock. After a predetermined amount of time, the engine spark is advanced to improve efficiency. After this advance takes place, the knock detector again produces an output and the spark is retarded.

Referring to FIGS. 3a through 3d, the waveforms associated with a knock sensor in accordance with an embodiment of this invention, produce only barely audible knock and no loud knock. FIG. 3a shows the derivitive of the throttle position signal which is relatively large whenever there is any relatively rapid change in position. FIG. 3b is similar to FIG. 1c and shows the output of a knock sensor. However, in this case the knock sensor output barely exceeds the knock threshold and there are no loud knocks. FIG. 3c (which is similar to FIG. 1d except it includes the effects of low pass filtering) shows the output of an envelope detector and low pass filter which produce an output whenever the knock sensor output exceeds an audible knock threshold. FIG. 3d shows that the spark advance responds both to the derivative of the throttle position signal and the output of the envelope detector and low pass filter circuits. In particular, the spark advance is retarded before there is any audible knock. Such retarding is initiated by the change in the derivative of the throttle position signal. Further, between the two initial outputs from the knock sensor the spark is advanced as a result of the decreasing rate of change in the throttle position. The third detection of audible knock in FIG. 3b produces a spark advance change in FIG. 3d in the same direction as the spark advance change produced in FIG. 1e as a result of the detection of knock in FIG. 1d. Any similarity between FIG. 1e and FIG. 3d exists at that third detection of knock because the derivitive of the throttle position signal has returned to zero and does not influence the spark advance change.

Figure 3:
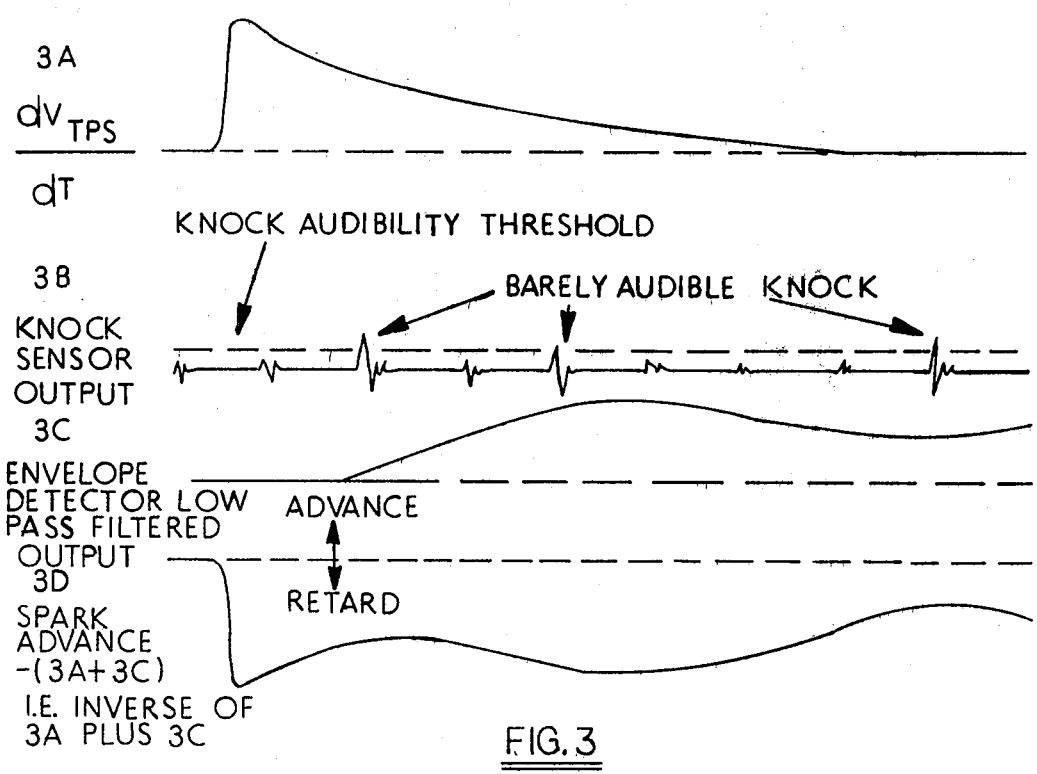
FIGS. 3a through 3d are graphical representations of signals related to a knock feedback system in accordance with an embodiment of this invention, including the derivative of the throttle position signal versus time, knock sensor output, envelope detector and low pass filtered output, and spark advance.

Relating the waveforms of FIG. 3 to that of FIG. 2, the output of knock sensor 10 is shown in FIG. 3b, the output of low pass filter 14 is shown in FIG. 3c, and the derivitive of the throttle position signal shown in FIG. 3a is the output of high pass filter 13. The spark advance signal shown in FIG. 3d is generated within proportional retardation modulator 18 in response to the input control signal to produce an output spark occurring at a timing consistent with the desired spark advance as shown in FIG. 3d. As is known, the advance or retard of a spark is generally referenced to the top dead center position of the piston as it travels up and down in the cylinder. Typically, the spark voltage firing occurs before the piston reaches top dead center to start its downward travel. Thus, the typical spark is advanced.

Various modifications and variations will no doubt occur to those skilled in the various arts to which this invention pertains. For example, the particular implementation of the vibration knock sensor may be varied from that disclosed herein. These and all other variations which basically rely on the teachings through which this disclosure has advanced the art are properly considered within the scope of this invention as defined by the appended claims.

I claim:

1. A knock control system for providing a signal suitable for controlling ignition of a vehicle mounted internal combustion engine so as to eliminate knock includes:
    a knock sensor means for generating a signal indicating the occurrence of a knock vibration;
    an engine operating parameter sensing means for detecting the occurrence of an engine operating parameter related to the occurrence of knock;
    said engine operating parameter sensing means including:
    a throttle angle position sensor means;
    an envelope detection circuit coupled to receive a signal from said knock sensor;
    a low pass filter coupled to receive a signal from said envelope detection circuit;
    a high pass filter coupled to said throttle angle position sensor means for processing an output signal from said throttle angle position sensor means;
    a summer coupled to receive signals from both said high pass filter and said low pass filter for processing said signals for knock control;
    a proportional retard ignition module for receiving said knock control signal to retard the spark timing thereby avoiding knock; and wherein
    said knock sensor is an acceleration sensor and said throttle angle position sensor is a resistive slider type sensor.

2. A method for controlling ignition of a vehicle mounted internal combustion engine including:
    generating a signal indicating occurrence of knock;
    detecting the occurrence of an engine operating parameter related to the occurrence of knock by sensing the throttle position angle;
    generating an envelope detection signal in response to a signal indicating the occurrence of a knock vibration;

passing through a low pass filter the envelope detection signal;
passing through a high pass filter the signal indicating throttle angle position; and
summing the signals from the high pass filter and low pass filter for producing a combined knock control signal thereby providing a signal suitable for retarding engine spark advance in anticipation of spark.

* * * * *